(12) United States Patent
Stecewycz

(10) Patent No.: US 10,024,037 B2
(45) Date of Patent: Jul. 17, 2018

(54) DIVERTER MODULE FOR CONSERVING WATER SUPPLIED BY A HOT WATER TANK

(71) Applicant: Joseph Stecewycz, Groton, MA (US)

(72) Inventor: Joseph Stecewycz, Groton, MA (US)

( * ) Notice: Subject to any disclaimer, the term of this patent is extended or adjusted under 35 U.S.C. 154(b) by 113 days.

(21) Appl. No.: 15/201,607

(22) Filed: Jul. 4, 2016

(65) Prior Publication Data

US 2018/0002903 A1    Jan. 4, 2018

(51) Int. Cl.
*F24D 17/00* (2006.01)
*E03B 1/04* (2006.01)
*F16K 11/048* (2006.01)
*E03B 7/04* (2006.01)

(52) U.S. Cl.
CPC ............ *E03B 1/048* (2013.01); *E03B 7/045* (2013.01); *F16K 11/048* (2013.01); *F24D 17/0078* (2013.01); *Y10T 137/6497* (2015.04)

(58) Field of Classification Search
CPC ............ F24D 17/0078; G05D 23/1326; G05D 23/1333; E03B 7/045; F16K 11/048; Y10T 137/6497; Y10T 137/87096; Y10T 137/87113
USPC ....................................................... 236/12.11
See application file for complete search history.

(56) References Cited

U.S. PATENT DOCUMENTS

| | | | |
|---|---|---|---|
| 1,985,929 A * | 1/1935 | Jorgensen .......... | G05D 23/1326 236/12.22 |
| 2,842,155 A * | 7/1958 | Peters ................ | G05D 23/1326 122/13.3 |
| 4,331,292 A * | 5/1982 | Zimmer ................ | F24D 17/00 137/337 |
| 4,997,007 A | 3/1991 | Niemann | |
| 5,452,740 A | 9/1995 | Bowman | |
| 5,524,666 A | 6/1996 | Linn | |
| 5,794,643 A | 8/1998 | Brice | |
| 6,032,687 A | 3/2000 | Linn | |
| 6,182,699 B1 | 2/2001 | Hawkes | |
| 6,216,737 B1 * | 4/2001 | Taylor ..................... | F16K 11/22 137/271 |
| 6,536,464 B1 * | 3/2003 | Lum ........................ | E03B 7/045 122/13.3 |
| 7,773,868 B2 | 8/2010 | Moore | |
| 8,789,560 B2 * | 7/2014 | Holley .................. | F16K 11/165 137/597 |
| 8,978,993 B1 | 3/2015 | Romero | |
| 9,255,644 B1 | 2/2016 | Voigt | |
| 2004/0159353 A1 | 8/2004 | King | |
| 2009/0145490 A1 | 6/2009 | Kershisnik | |
| 2009/0288720 A1 | 11/2009 | Krausse | |
| 2011/0089249 A1 | 4/2011 | Johnson | |
| 2011/0168266 A1 | 6/2011 | Fiora | |
| 2014/0238910 A1 | 8/2014 | Greenthal | |

* cited by examiner

*Primary Examiner* — Kevin Murphy
(74) *Attorney, Agent, or Firm* — Joseph Stecewycz

(57) ABSTRACT

The invention is a water conservation system for conserving water supplied by a hot water tank, the system functioning to selectively open a diverter fluid path extending between a hot water supply line and a cold water supply line, and operating a return module to return unheated water in the hot water supply line back to the hot water tank using the cold water supply line until the water in the hot water supply line flows hot.

15 Claims, 7 Drawing Sheets

DIVERTER MODULE FOR CONSERVING WATER SUPPLIED BY A HOT WATER TANK

FIELD OF THE INVENTION

The present invention relates to a system and method for conserving water supplied by a hot water tank and, in particular, to a method for returning unheated water to the hot water tank.

BACKGROUND OF THE INVENTION

Almost all conventional residential homes, condominiums, and apartments have water supply systems that provide both hot and cold running water to the resident or a guest. FIG. 1 shows a simplified diagram of a residential water system 10 in which all supplied water 14 is provided to the residence through a water line 12, such as from a public water station or a private well. A portion 16 of the supplied water 14 flows along a cold water supply line 18 to be accessed by a user via a cold water faucet 20. The remaining portion 22 of the supplied water 14 is usually diverted to a hot water tank 24 to be heated and made available to the user via a hot water supply line 26 and a hot water faucet 28.

It has been known in the art that it is common practice for a resident of the average household to run, and thus discard, unheated water present in the hot water supply line 26 until the unheated water has been purged and the hot water from the hot water tank 24 is available at the hot water faucet 28 or at a shower head, for example. As the discarded water is sent down a drain, this otherwise clean and useful water is essentially wasted. Over a period of time, the clean water that is thus discarded may amount to many hundreds of gallons of water per annum per household. Moreover, the user may continue to run the water when not being needed, such as during lathering or shampooing, so as to maintain the hot water supply at a sufficient warm temperature at the hot water faucet 28.

To date, there have not been satisfactory methods to conserve such wasted water. Many conscientious residents collect the water in a bucket, for example, for later use in watering plants, or for pouring into a clothes washing machine. However, this requires extra physical effort, and cannot possibly conserve all the water that is run and not used while bringing hot water to the faucet or shower head. From a practical standpoint, most residents will not concern themselves with the wastefulness of sending clean water down the drain, as the living standards in most developed countries have conditioned people to use resources as necessary without regard to conservation practices, and there is a lack of understanding of basic scientific and environmental principles among the general population.

BRIEF SUMMARY OF THE INVENTION

In one aspect of the present invention, a water conservation system for conserving water supplied by a hot water tank having a cold water supply line attached to the hot water tank and a hot water supply line providing water from the hot water tank to a user comprises: a diverter module adapted to selectively open a diverter fluid path extending between the hot water supply line and the cold water supply line in response to an action of the user; and a return module connected to the cold water supply line, the return module adapted to return water to the hot water tank in response to the opening of the diverter fluid path.

In another aspect of the present invention, a method for conserving water supplied by a hot water tank comprises the steps of: sensing movement of water in the hot water supply line when the hot water faucet is opened; if the temperature of the water in the hot water supply line proximate the hot water faucet is below a specified temperature, diverting the water in the hot water supply line from the hot water faucet back to the hot water tank; and if the sensed temperature of the water in the hot water supply line proximate the hot water faucet is at or above the specified temperature, allowing the water in the hot water supply line to flow to the hot water faucet.

In still another aspect of the present invention, a diverter module for use in a water conservation system comprises: a diverter housing having a substantially elliptical cross section; a diverter input gate hingedly attached to an input end of the diverter housing; a diverter output gate hingedly attached to an output end of the diverter housing; a bi-radial cantilever spring rotatably attached to a spring pivot pin, the spring pivot pin attached to an inside surface of the diverter housing; a first connecting rod attached to the diverter input gate and to a first arm of the bi-radial cantilever spring; and a second connecting rod attached to the diverter output gate and to a second arm of the bi-radial cantilever spring.

The additional features and advantage of the disclosed invention is set forth in the detailed description which follows, and will be apparent to those skilled in the art from the description or recognized by practicing the invention as described, together with the claims and appended drawings.

BRIEF DESCRIPTIONS OF THE DRAWINGS

The foregoing aspects, uses, and advantages of the present invention will be more fully appreciated as the same becomes better understood from the following detailed description of the present invention when viewed in conjunction with the accompanying figures, in which:

FIG. 3 is a flow diagram illustrating operation of the water conservation system of FIG. 2;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

The present invention results from the observation that an effective method of conserving water supplied by a hot water tank is to return unheated or cool water to the hot water tank. As described below, this is accomplished without requiring any unconventional action on part of the user.

Figure 1:
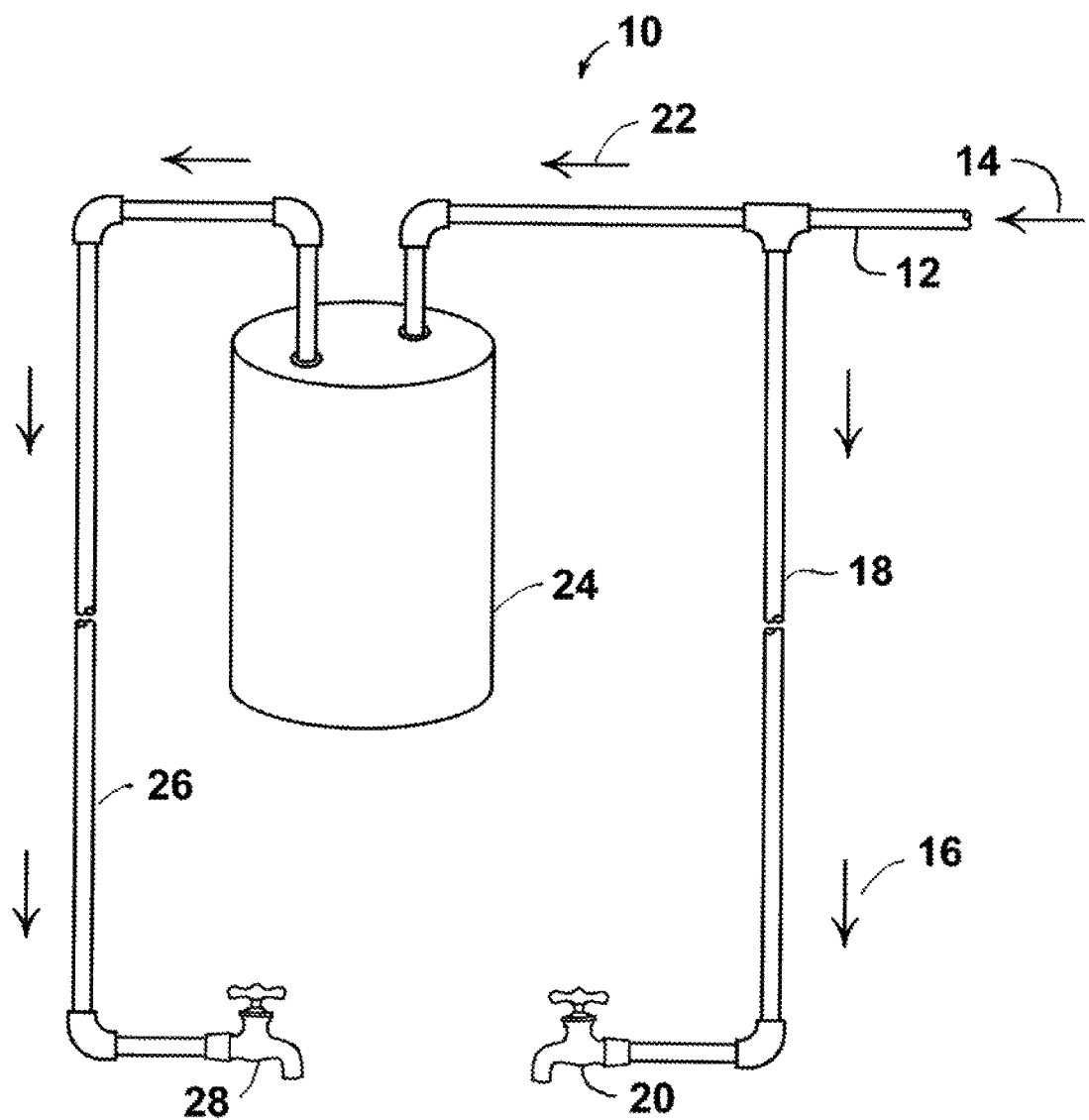
FIG. 1 is a diagrammatical illustration of a residential water system, in accordance with the present state of the art.
Figure 2:
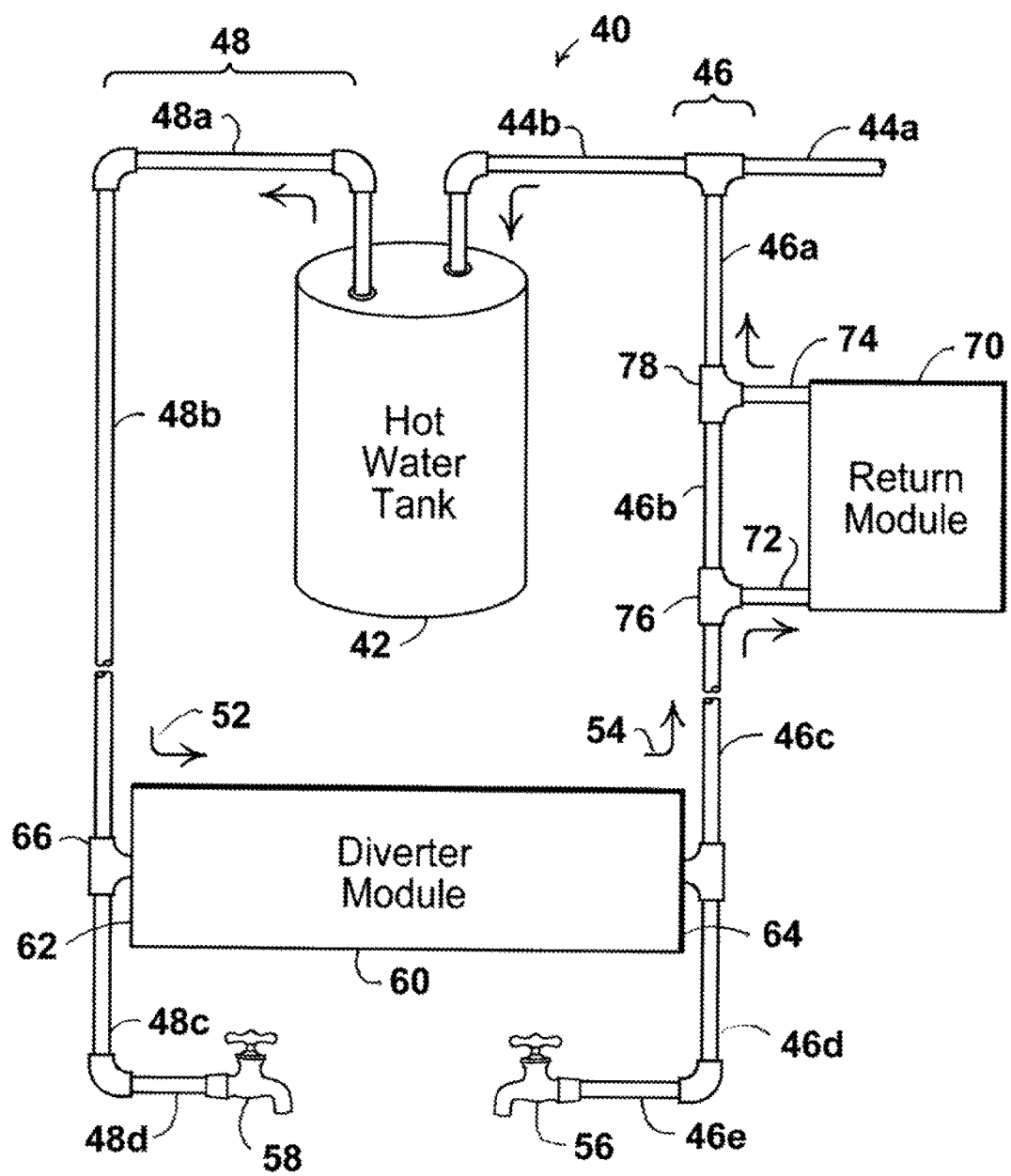
FIG. 2 is a diagrammatical illustration of a water conservation system incorporating a diverter module and a return module with a hot water tank, in accordance with the present invention.

There is shown in FIG. 2 a water conservation system 40 for conserving water supplied by a hot water tank 42, in accordance with the present invention. The water conservation system 40 may be attached to a conventional main water supply line 44a, 44b supplying water to the hot water tank 42. As will become apparent from the description below, the conventional residential water system 10 shown in FIG. 1 can be readily converted or upgraded to a water conservation system in accordance with the present invention, by: (i) providing fluid access to both the cold water supply line 18 and the hot water supply line 26, and (ii) installing two innovative modules at the points of fluid access in the residential water system 10.

The water conservation system 40, shown in FIG. 2, includes a plurality of existing plumbing components that are normally present in most conventional residential water systems. In the example shown, the existing plumbing components include: (i) the residential hot water tank 42, (ii) a cold water supply line 46 attached to the residential hot water tank 42, here shown configured as a plurality of serially connected cold water supply line segments 46a, 46b, 46c, 46d, and 46e, delivering cold water to a cold water faucet 56, and (iii) a hot water supply line 48, here shown configured as a plurality of serially connected hot water supply line segments 48a, 48b, 48c, and 48d, delivering hot water to a hot water faucet 58.

In an exemplary embodiment, the water conservation system 40 further includes two innovative modules. The first is a diverter module 60 installed between, and connected to both, the hot water supply line 48 and the cold water supply line 46. The second is a return module 70 installed in a parallel configuration across the cold water supply line 46.

Installation of the diverter module 60 into the water conservation system 40 requires the attachment of an input end 62 of the diverter module 60 to the hot water supply line 48 such that the water flowing in the hot water supply line 48 is in selective fluid communication with the diverter module 60. Installation of the diverter module 60 also requires the attachment of an output end 64 of the diverter module 60 to the cold water supply line 46 such that the water present in the diverter module 60 is in selective fluid communication with the cold water supply line 46 and, ultimately, with the hot water tank 42.

In the diagram of the water conservation system 40, a first diverter tee 66 is used to represent the fluid communication formed between the hot water supply line 48 and the input end 62 of the diverter module 60. It should be noted that the two hot water supply line segments 48b and 48c would correspond to the hot water supply line 26 in the residential water system 10, in FIG. 1, if the hot water supply line 26 had been separated or opened, and rejoined with the insertion of the first diverter tee 66, or with the attachment of a functionally equivalent component as exemplified in the embodiment disclosed below.

It should be understood that the connection between the diverter module 60 and the hot water supply line 26, shown in FIG. 2, need not be a plumbing tee, and that the connection or attachment may be achieved by any practical plumbing configuration known in the relevant art. A second diverter tee 68 is shown in the cold water supply line 46 to represent a similar configuration in which the output end 64 of the diverter module 60 is in fluid communication with the cold water supply line 46.

Installation of the return module 70 into the water conservation system 40 requires a first fluid attachment of an input water line 72 of the return module 70 to the cold water supply line 46, and a second fluid attachment of an output water line 74 of the return module 70 to the cold water supply line 46. The first fluid attachment is represented by a first return tee 76, and the second fluid attachment is represented by a second return tee 78. As stated above, (i) neither return tee 76, 78 need be a plumbing tee, and (ii) the connection or attachment method may be realized by any practical plumbing configuration known in the relevant art.

As can be further appreciated by one skilled in the relevant art, the original cold water supply line 18 of the conventional residential water supply system 10, shown in FIG. 1, can be modified with the installation of the return input tee 76, or a functionally equivalent component, and the return output tee 78, or a functionally equivalent component, into the cold water supply line 18, so as to replicate the configuration of the cold water supply line segments 46a, 46b, and 46c, as in FIG. 2.

In summary, conversion of the conventional residential water system 10, shown in FIG. 1, into the water conservation system 40 of the present invention, shown in FIG. 2, requires: (i) creating a break or opening in the hot water supply line 26 and attaching the input end 62 of the diverter module 60, (ii) creating a first break or opening in the cold water supply line 18 and attaching the output end 64 of the diverter module 60, (iii) creating a second break in the cold water supply line 18 and attaching the input end 72 of the return module 70, and (iv) creating a third break in the cold water supply line 18 and attaching the output end 74 of the return module 70.

Operation of the water conservation system 40 can be best described with additional reference to flow diagram 80, shown in FIG. 3. At step 82, the user may open the hot water supply valve 58 to begin the process of dispensing hot water into a tub, for example, or sending hot water to a shower head. In response to the action of water beginning to flow in the hot water supply line segment 48b, the diverter module 60 closes the flow of tank water to the hot water faucet 58, at the input end 62 of the diverter module 60, at step 84. The diverter module 60 also closes the flow of supply water to the cold water faucet 56, at the output end 64 of the diverter module 60.

This action opens a fluid path for the return of unheated water to the water tank 42 through the diverter module 60, as indicated by arrows 52 and 54. The combination of: (i) the closing of the hot water supply line 48 at the input end 62 and (ii) the closing of the cold water supply line 46 at the output end 64 produces a water pressure pulse in the cold water supply line 46 which is sensed by the return module 70, at step 86. In response to the detection of the water pressure pulse, a pump (not shown) in the return module 70 is activated to force the unheated water in the hot water supply line segment 48b through the diverter module 60, through the cold water supply pipe 46, and back to the hot water tank 42, at step 88. The cold water supply line 46 may additionally be blocked in the return output tee 78, to insure that the return module 70 sends the unheated water in the cold water supply line segment 46c to the hot water tank 42.

Figure 4:
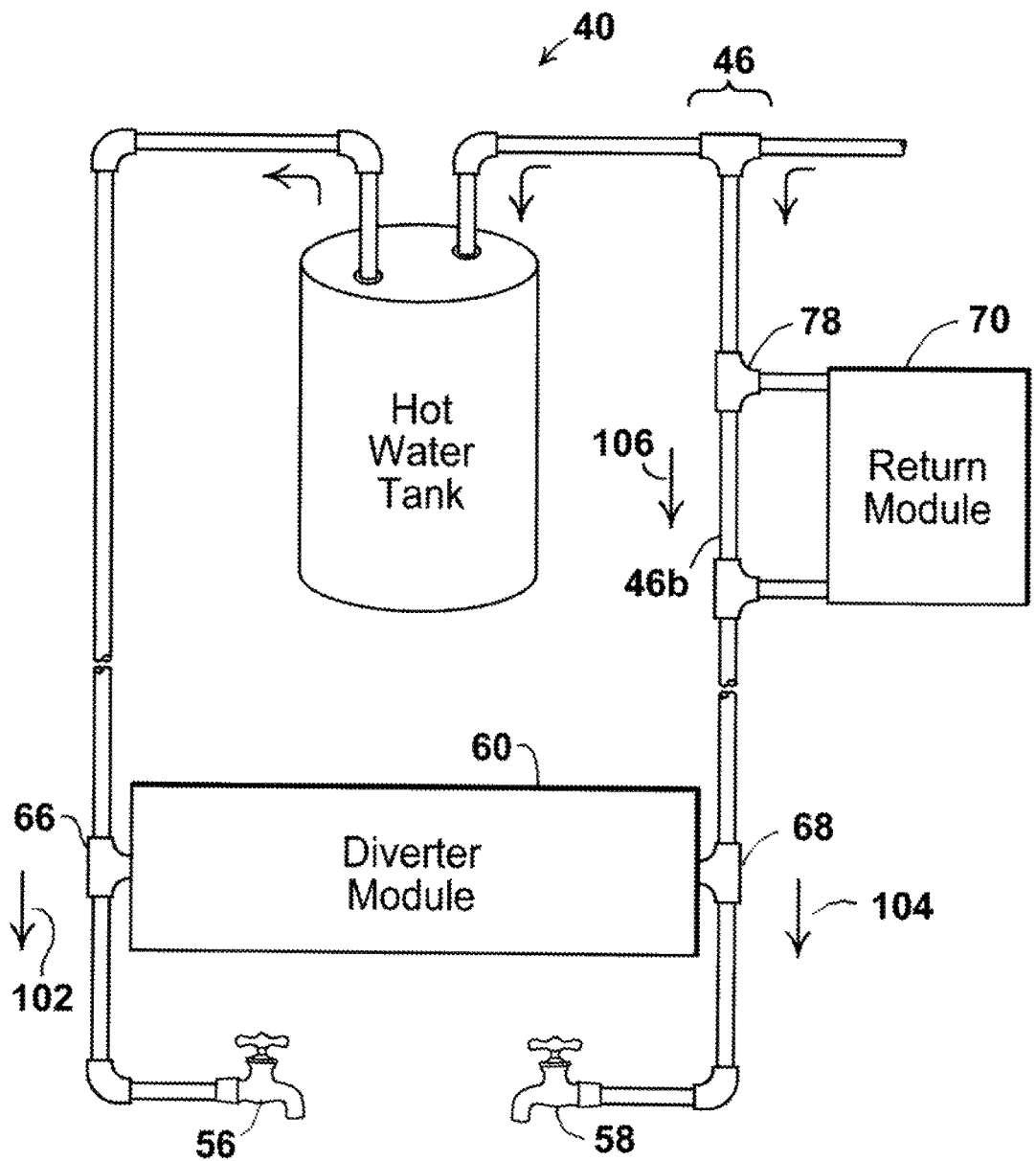
FIG. 4 is a diagrammatical illustration of the water conservation system of FIG. 2 showing water flow when hot water is being delivered.

The unheated water in the hot water supply line 48 continues to flow through the diverter module 60 and through the cold water supply line 46 until heated water begins to enter the diverter module 60 from the hot water tank 42, at step 90. When the temperature of water flowing through the diverter module 60 has increased to a predetermined level, the diverter module 60 reopens the hot water supply line 48 at the diverter input tee 66, to allow hot water to flow to the hot water faucet 58, at step 92. This is indicated by the hot water flow arrow 102 in FIG. 4.

At the same time, the diverter module 60 also opens the cold water supply line 46 at the diverter output tee 68 to allow cold water to flow to the cold water faucet 56, at step 94, as indicated by cold water flow arrow 104. In response to the opening of the cold water supply line 46, the pump in the return module powers down, at step 94, and the return output tee 78 opens to allow supply water to flow through the cold water supply line segment 46, as indicated by the return of the supply water flow 106.

The water conservation system 40 then resumes normal operation, at step 96, with cold water flowing to the cold water faucet 56 via the cold water supply line 46, and hot water flowing to the hot water faucet 58 via the hot water supply line 48. A thermal component (not shown) in the he fluid path through the diverter module 60 continues to restrict the flow through the diverter module 60 as long as the water flowing through the hot water supply line 48 remains above a predetermined temperature.

Figure 5:
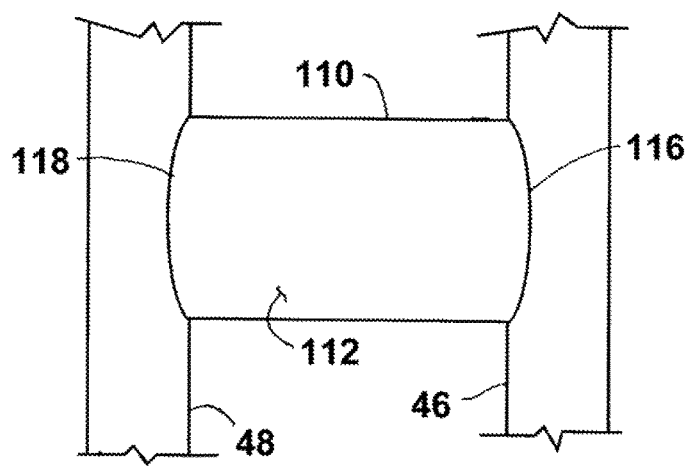
FIG. 5 is a diagrammatical illustration of a diverter module installed between a hot water delivery line and a cold water delivery line.

There is shown in FIG. 5 an exemplary embodiment of a diverter module 110 that is configured for attachment between the cold water supply line 46 and the hot water supply line 48, without requiring cutting either water line to install an input tee or an output tee. In the configuration shown, the diverter module 110 includes a cylindrical diverter housing 112 having a substantially elliptical cross-sectional shape. The diverter housing 112 may comprise a metal, such as copper, having essentially the same coefficient of expansion as the supply line material, also typically copper or a copper alloy, forming the cold water supply line 46 and the hot water supply line 48. For residential water systems in which a plastic or a composite material is used for conveying fluids, the diverter housing 112 may be plastic or composite, so as to allow attachment with chemical compounds or epoxies. Accordingly, the diverter module 110 may be attached using welded or soldered seams 116 and 118, as is well-known in the relevant art.

Figure 6:
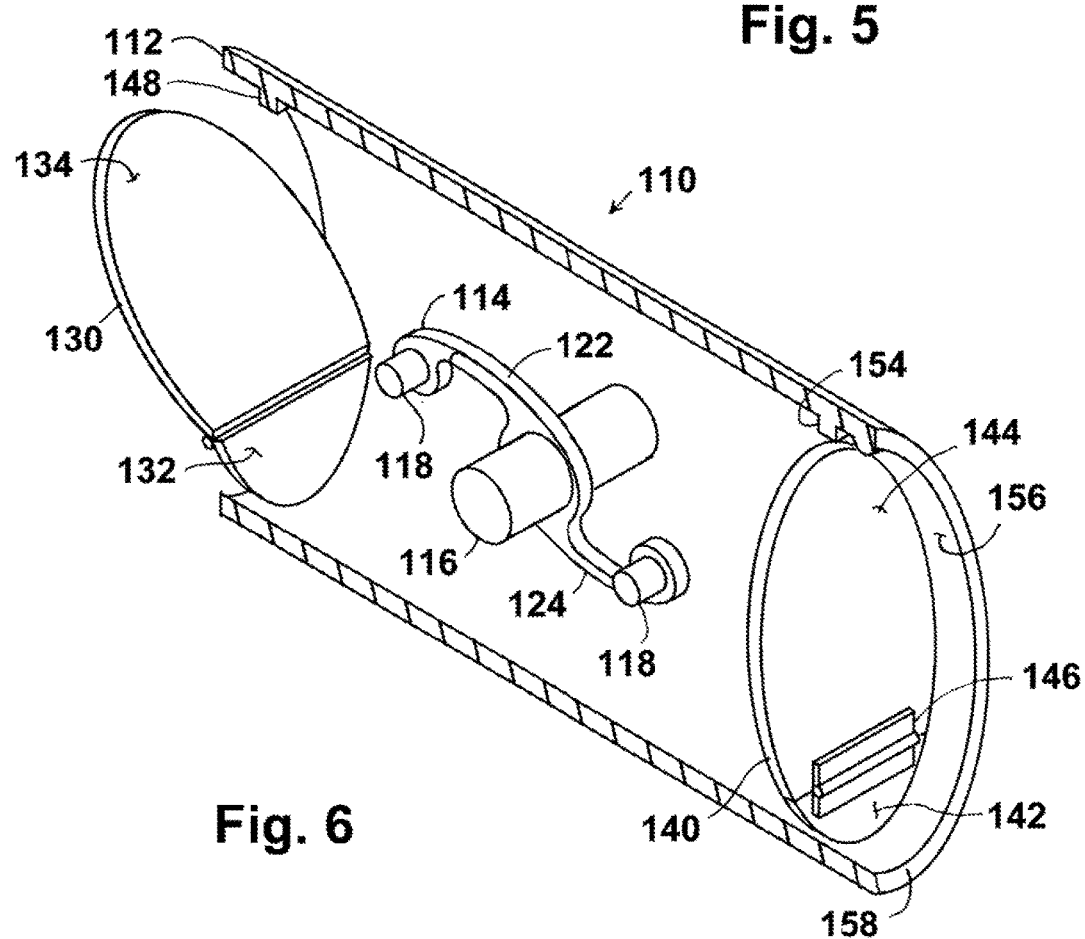
FIG. 6 is an isometric cutaway diagrammatical illustration of the diverter module of FIG. 5 showing an input diverter gate, a bi-radial cantilever spring, and an output diverter gate, in accordance with the present invention.

FIG. 6 is an isometric, cutaway, diagrammatical view showing the major internal components of the diverter module 110. A bi-radial cantilever spring 114 is secured to the inside of the diverter housing 112 by mounting onto a spring pivot pin 116. The bi-radial cantilever spring 114 is thus free to rotate about the spring pivot pin 116, but is prevented from moving laterally. A first link pin 118 is provided at the end of a first spring cantilever arm 122, and second link pin 118 is provided at the end of a second spring cantilever arm 124. In an exemplary embodiment, the first spring cantilever arm 122 and the second spring cantilever arm 124 are fabricated from two or more layers of different metals and metal alloys to form a bi-metallic layer pair. The two metals or metal alloys each have a different coefficient of thermal expansion, as is understood in the relevant art. Accordingly, as the ambient temperature is increased, the first spring cantilever arm 122 and the second spring cantilever arm 124 will tend to bend inwardly, with the link pins 118 moving towards the spring pivot pin 116, as shown below.

The diverter module 110 also includes a diverter input gate 130 and a diverter output gate 140. Both the diverter input gate 130 and the diverter output gate 140 have specific planar elliptical shapes. As explained in greater detail below, having planar elliptical shapes enables the diverter input gate 130 and the diverter output gate 140 to block water flow through the diverter housing 112 when the diverter input gate 130 and the diverter output gate 140 are completely closed. Also, having planar elliptical shapes enables the diverter input gate 130 and the diverter output gate 140 to block water flow through the hot water supply line 48 and the cold water supply line 46, respectively, when the diverter input gate 130 and the diverter output gate 140 are completely opened from the diverter housing 112.

The diverter input gate 130 includes a diverter input gate base 132 attached to the inner surface 156 of the diverter module 110. In the exemplary embodiment shown, the diverter input gate base 132 is connected to a diverter input gate closure 134 by a first hinge 136. This configuration allows for the diverter input gate closure 134 to rotate into and out of the diverter housing 112 and the diverter module 110 as needed. This configuration also allows for the diverter input gate closure 134 to rotate into and out of the hot water supply line 48 as needed. In an alternative embodiment (not shown), either or both of the diverter input gate 130 and the diverter output gate 140 may be fabricated from a plastic material, and include a groove instead of a hinge to enable bending of the upper input gate closure section relative to the bottom base section.

The diverter output gate 140 includes a fixed, diverter output gate base 142 connected to a diverter output gate closure 144 by a second hinge 146. The diverter output gate closure 134 can be rotated into and out of the interior of the diverter housing 112. A gate detent 152 and an output gate stop 154 are provided on the inner surface 156 of the diverter housing 112 near an output face 158 of the diverter housing 112. The output gate stop 154 serves to prevent the upper, output gate closure 134 from rotating into the interior of the diverter housing 112. The gate detent 152 is provided to frictionally secure the upper, output gate closure 134 in a closed position until forced into an open position. An input gate stop 148 serves to prevent the upper, input gate closure 134 from rotating into the interior of the diverter housing 112.

Figure 7:
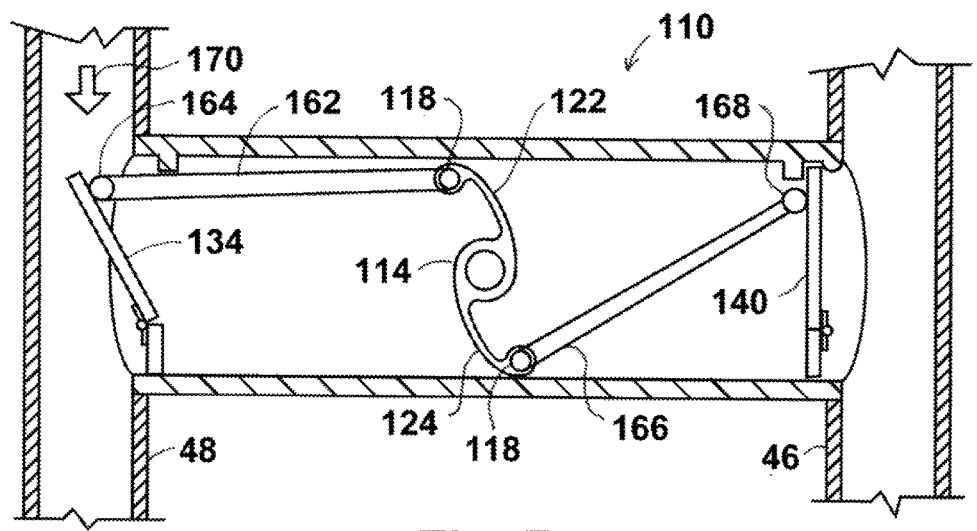
FIG. 7 is a cross sectional diagrammatical illustration of the diverter module of FIG. 6 in an equilibrium mode.

FIG. 7 is a sectional view of the diverter 110 with the input diverter gate 130 in a slightly open position, and the output diverter gate 140 in a closed position. This is an equilibrium position assumed by the input diverter gate 130 and the output diverter gate 140 when some time has passed since there had been a request for hot water from the water conservation system 40.

There is also shown an input connecting rod 162 connecting the first link pin 118 on the first spring cantilever arm 122 to a first attachment link 164 on the input gate closure 134 of the input diverter gate 130. An output connecting rod 166 connects the second link pin 118 on the second spring cantilever arm 124 to a second attachment link 168 on the output gate closure 144 of the output diverter gate 140. It should be noted that the input connecting rod 162 and the output connecting rod 166 are not shown in FIG. 6 for clarity of illustration. The first attachment link 164 allows the input connecting rod 162 to rotate relative to the input gate closure 134. The second attachment link 168 allows the output connecting rod 166 to rotate relative to the output gate closure 144.

Figure 8:
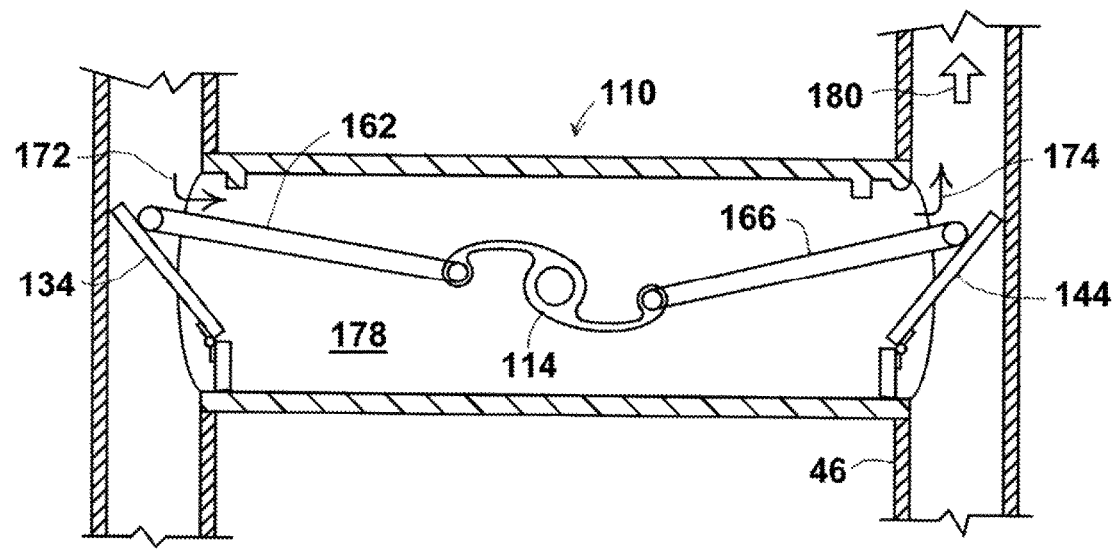
FIG. 8 is a cross sectional diagrammatical illustration of the diverter module of FIG. 6 with the diverter gates in an open mode.

With the diverter module 110 in the equilibrium mode of FIG. 7, the user may turn on the hot water faucet 58, shown in FIG. 2. This action causes an initial flow of unheated water 170 in the hot water supply line 48. This flow causes the diverter input gate closure 134 to be fully rotated into an open position, and to close off the hot water supply line 48 at the diverter module 110, as shown in FIG. 8. Preferably, the diverter input gate closure 134 has a particular elliptical shape precisely conforming to the elliptical shape of the inside of the hot water supply line 48 when intercepted by a plane oriented at the same angle as the fully-opened diverter input gate closure 134. This allows the input diverter gate closure 134 to come to rest at this angle, inside the hot water supply line 48, effectively close off flow, and divert all or most of the unheated water into the diverter module 110, as indicated by arrow 172. That is, the bi-radial cantilever spring 114 is configured to place the input connecting rod 162 and the output connecting rod 166 into states of compression so as to maintain the diverter input gate 130 and the diverter output gate 140 in open positions relative to the diverter housing 112.

As the input diverter gate closure 134 is rotating into the open position inside the hot water supply line 48, the combination of the input connecting rod 162, the bi-radial cantilever spring 114, and the output connecting rod 166 force the output gate closure 144 to rotate into the cold water supply line 46 and assume an open position, as shown. This action functions to divert the unheated water flowing through the diverter module 110 into the cold water supply line 46, as indicated by arrow 174. It should be understood that the essentially simultaneous actions of the input diverter gate closure 134 closing off the hot water supply line 48 and the output gate closure 144 closing off the cold water supply line 46 produce a water pressure pulse 180 in the cold water supply line 46. The water pressure pulse 180 is detected by the return module 70, shown in FIG. 4, as explained in greater detail below.

Figure 9:
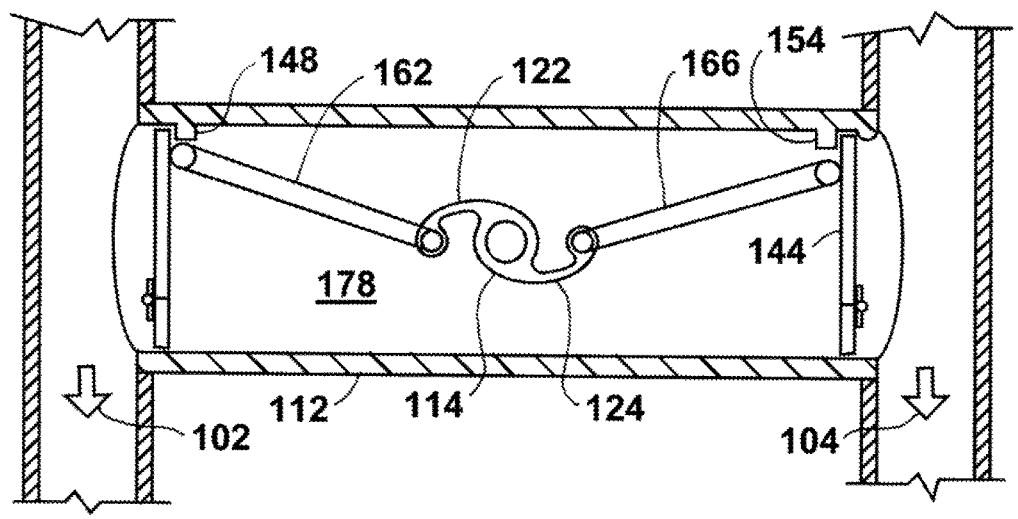
FIG. 9 is a cross sectional diagrammatical illustration of the diverter module of FIG. 6 with the diverter gates in a closed mode.
Figure 10:
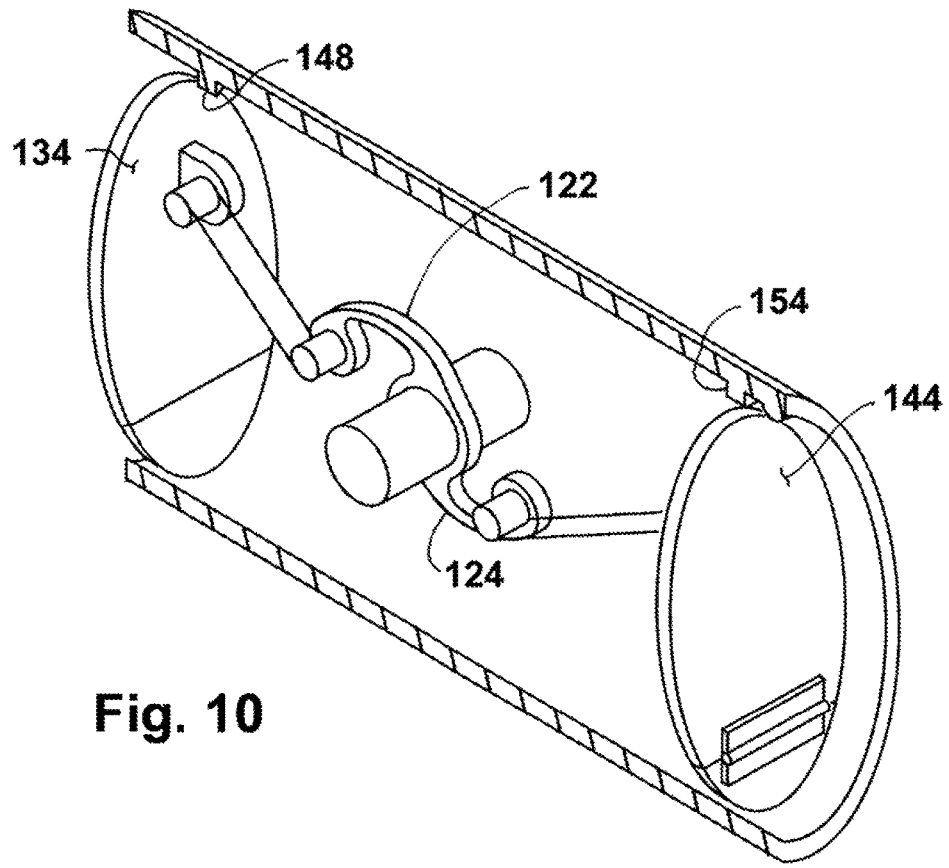
FIG. 10 is an isometric cutaway diagrammatical illustration of the diverter module of FIG. 6 showing the input diverter gate and the output diverter gate in closed mode.

The diverter module 110 remains in the open mode of FIG. 8 until the unheated water in the hot water supply line 48 has passed through the diverter module 110 and the temperature of the water flowing through the diverter module 110 rises to a target temperature. As explained above, the first spring cantilever arm 122 and the second spring cantilever arm 124 of the bi-radial cantilever spring 114 comprise bi-metallic layers. As the temperature of the collected water 178 inside the diverter housing 112 increases in temperature, the first spring cantilever arm 122 and the second spring cantilever arm 124 decrease in the radius of curvature, as shown in FIGS. 9 and 10. This causes the distance between the link pins 118 to shorten and place the input connecting rod 162 and the output connecting rod 166 into states of tension.

These tension forces cause the diverter input gate closure 134 and the diverter output gate closure 144 to completely close. Note that the gate stops 148 and 154 are essential features on the diverter housing 112, and are necessary to insure that the diverter module 110 is properly closed when hot water becomes available. When the diverter module 110 is in the closed mode, the collected water 178 tends to remain hot so as to maintain the small radiuses of curvature in the first spring cantilever arm 122 and in the second spring cantilever arm 124. This, in turn, insures that the diverter input gate closure 134 and the diverter output gate closure 144 remain closed and allow the hot water from the hot water tank 42 to keep flowing to the hot water faucet 58. It can be appreciated that the copper diverter housing 112 has also been heated in the process of passing hot water, and also serves as a thermal source to help maintain the temperature of the collected water 178 at or near the target temperature.

The continued hot water flow adjacent the diverter module 110 further insures that the collected water 178 remains hot until the user shuts down the hot water flow. With the diverter module 110 in the closed mode, the water conservation system 40 functions as a conventional residential water system. That is, hot water is available at the hot water faucet 58, as indicated by the hot water flow 102, and cold water is again available at the cold water faucet 56, as indicate by the cold water flow 104.

Figure 11:
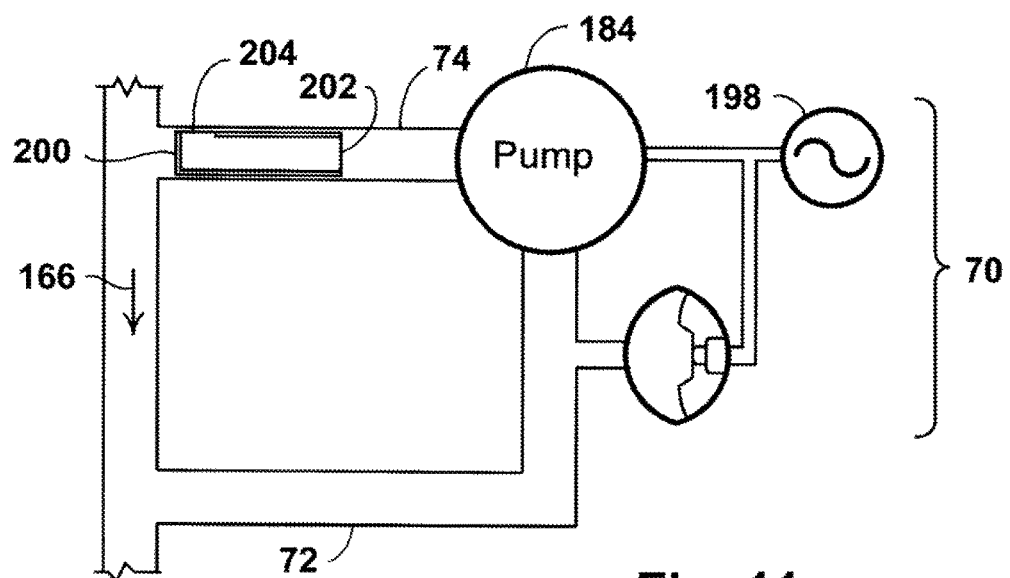
FIG. 11 is a diagrammatical illustration of the return module of FIG. 2 showing a pump, a water pressure pulse sensor, a sliding fluid valve, and an electrical power source, in accordance with the present invention.

FIG. 11 provides a diagrammatical illustration of components in the return module 70. The input water line 72 is in fluid communication with a pump 184. As explained above, the pump 184 functions to assist the return of unheated water to the hot water tank 42. Accordingly, the pump 184 is activated when the unheated water is diverted to the diverter module 110, shown in FIG. 5. Activation of the pump 184 is provided by an ON signal sent by a water pressure pulse sensor 190.

Figure 12:
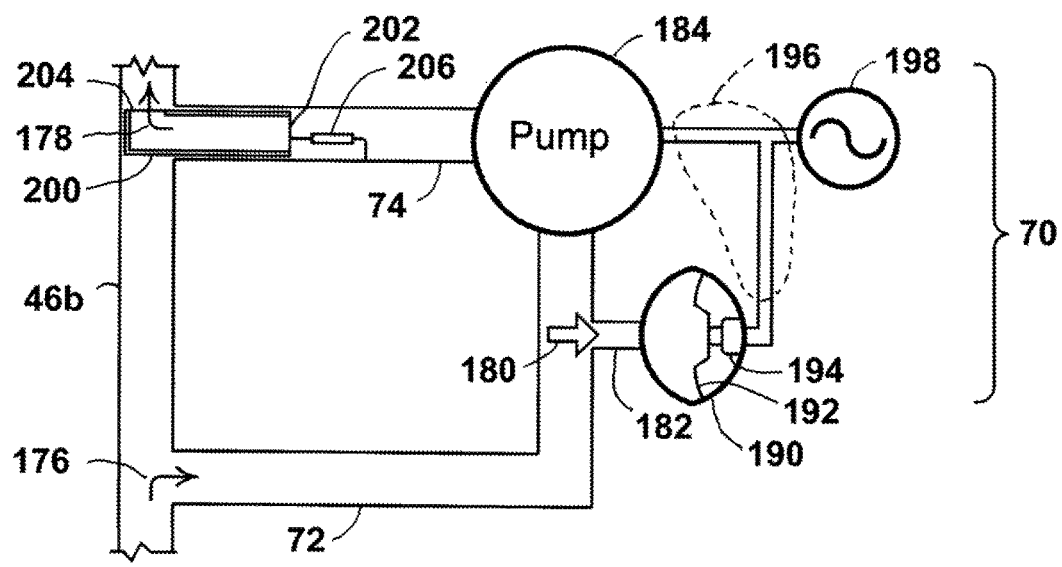
FIG. 12 is a diagrammatical illustration of the return module of FIG. 11 functioning to return water to the hot water tank.

Before the user turns on the hot water faucet 58 to obtain hot water, supply water flow 106 is available to the user via the cold water supply line 46, as shown in FIG. 11. When the water pressure pulse 180 is received at the water pressure pulse sensor 190, via the input water line 72 and a fluid port 182, as shown in FIG. 12, a diaphragm 192 in the water pressure pulse sensor 190 flexes and turns on an electrical switch 194. The electrical switch 194 closes an electrical power circuit 196 to provide electrical power from an electrical power source 198 to the pump 184.

As the pump 184 powers up, cold water in the cold water supply line 46 is directed into the input water line 72, as indicated by arrow 176. The flow of the water in the input water line 72 and through the output water line 74 cause a retractable fluid valve 200 to slide inside the output water line 74 and partially into the cold water supply line 46. The unheated water being returned to the hot water tank 42 flows into an input port opening 202, through the retractable fluid valve 200, through a valve output port opening 204, and into the cold water supply line 46, as indicated by arrow 178.

It should be understood that the outer surface of the retractable fluid valve 200 closely conforms to the size and shape of the inside surface of the output water line 74. This congruity allows the retractable fluid valve 200 to freely slide within the output water line 74. The purpose of the retractable fluid valve 200 is to block the flow of supply water 106 in the cold water supply line segment 46*b*, and to direct water flow from the diverter module 110 through the pump 184 and to the hot water tank 42.

When the diverter module 110 closes because the flow of hot water has been achieved, as shown in FIG. 9, an increased working load is placed on the pump 184, causing the pump 184 to automatically shut down. This action causes the retractable fluid valve 200 to return to an equilibrium position out of the cold water supply line 46 and into the output water line 74, as shown in FIG. 11, the retractable fluid valve 200 being urged along by a spring component 206. When the retractable fluid valve 200 leaves the cold water supply line 46, and returns to a position shown in FIG. 11, supply water flow 106 returns to the cold water supply line 46.

Additionally, at some time after the user has stopped the use of the hot water in the hot water supply line 48, the temperature of the water in the diverter module 110 returns to ambient temperature. The temperature of the bi-radial cantilever spring 114 likewise returns to ambient temperature. The curvature of the first spring cantilever arm 122 and of the second spring cantilever arm 124 return to the configuration of the diverter module 110 to the equilibrium mode shown in FIG. 7.

It should be understood that one or more additional diverter modules 60 or 110 can be installed at other corresponding sets of hot water faucet 56 and cold water faucet 58 pairs (not shown), but that additional return modules 70 are not required. The return module 70 may be located near the hot water tank 42, where the electrical power source 176 may be most conveniently available. The water pressure pulse 180 can be produced by any of the diverter modules 60 or 110, and the water pressure pulse 180 can be detected by the single return module 70 in the water conservation system 40.

It is to be understood that the description herein is only exemplary of the invention, and is intended to provide an overview for the understanding of the nature and character of the disclosed water conservation system. The accompanying drawings are included to provide a further understanding of various features and embodiments of the method and devices of the invention which, together with their description serve to explain the principles and operation of the invention.

What is claimed is:

1. A diverter module suitable for use in a water conservation system having a hot water tank in fluid communication with a cold water supply line and a hot water supply line, said diverter module comprising:
   a diverter housing having a substantially elliptical cross section;
   a diverter input gate attached to a first end of said diverter housing;
   a diverter output gate attached to a second end of said diverter housing;
   a bi-metallic cantilever spring rotatably attached to a spring pivot pin, said spring pivot pin attached to an inside surface of said diverter housing;
   a first connecting rod attached to said diverter input gate and to a first arm of said bi-metallic cantilever spring; and
   a second connecting rod attached to said diverter output gate and to a second arm of said bi-metallic cantilever spring.

2. The diverter module of claim 1 wherein said diverter output gate comprises a gate base attached to an inside surface of said diverter housing and a gate closure hingedly attached to said gate base.

3. The diverter module of claim 2 wherein said diverter housing comprises a gate stop on an inside surface of said diverter housing, said gate stop functioning to prevent said gate closure from rotating into an interior of said diverter housing.

4. The diverter module of claim 1 wherein said bi-metallic cantilever spring is configured to place said first connecting rod and said second connecting rod into tension so as to maintain said diverter input gate and said diverter output gate in closed positions against said diverter housing.

5. The diverter module of claim 1 wherein said bi-metallic cantilever spring is configured to place said first connecting rod and said second connecting rod into compression so as to maintain said diverter input gate and said diverter output gate in open positions from said diverter housing.

6. The diverter module of claim 1 wherein said bi-metallic cantilever spring comprises a first spring cantilever arm fabricated from at least two layers of different metals, and a second spring cantilever arm fabricated from at least two layers of different metals.

7. The diverter module of claim 1 wherein said first connecting rod is rotatably attached to said diverter input gate and rotatably attached to said first arm of said bi-metallic cantilever spring.

8. The diverter module of claim 1 wherein said second connecting rod is rotatably attached to said diverter output gate and rotatably attached to said second arm of said bi-metallic cantilever spring.

9. The diverter module of claim 1 wherein said diverter module is configured such that when said diverter module is in an equilibrium position, said diverter input gate is in an open position at said first end of said diverter housing and said diverter output gate is in a closed position against said second end of said diverter housing.

10. The diverter module of claim 1 wherein, as cold water is caused to flow through said diverter housing, said first arm of said bi-metallic cantilever spring bends outwardly from said spring pivot pin to fully rotate said diverter input gate into an open position at said first end of said diverter housing, and said second arm of said bi-metallic cantilever spring bends outwardly from said spring pivot pin to open said diverter output gate at said second end of said diverter housing.

11. The diverter module of claim 1 wherein, as hot water is caused to flow through said diverter housing, said first arm of said bi-metallic cantilever spring bends inwardly towards said spring pivot pin to close said diverter input gate at said first end of said diverter housing, and said second arm of said bi-metallic cantilever spring bends inwardly towards said spring pivot pin to close said diverter output gate at said second end of said diverter housing.

12. A diverter module suitable for use in a water conservation system having a hot water tank in fluid communication with a cold water supply line and a hot water supply line, said diverter module comprising:
   a diverter housing having a substantially elliptical cross section;
   a diverter input gate disposed at a first end of said diverter housing, said diverter input gate having an input gate base attached to an inside surface of said diverter housing and an input gate closure hingedly attached to said input gate base;
   a diverter output gate attached at a second end of said diverter housing, said diverter output gate having an output gate base attached to an inside surface of said diverter housing and an output gate closure hingedly attached to said output gate base;
   a bi-radial cantilever spring rotatably attached to a spring pivot pin, said bi-radial cantilever spring fabricated from at least two layers of different metals, said spring pivot pin attached to an inside surface of said diverter housing;
   a first connecting rod attached to said input gate closure and attached to a first arm of said bi-radial cantilever spring via a first link pin, said first arm of said bi-radial cantilever spring having a first radius of curvature; and a second connecting rod attached to said output gate closure and attached to a second arm of said bi-radial cantilever spring via a second link pin, said second arm of said bi-radial cantilever spring having a second radius of curvature.

13. The diverter module of claim 12 wherein, as cold water is caused to flow through said diverter housing, said first arm of said bi-radial cantilever spring increases in radius of curvature so as to rotate outwardly said input gate closure at said first end of said diverter housing, and said second arm of said bi-radial cantilever spring increases in radius of curvature so as to open said output gate closure at said second end of said diverter housing.

14. The diverter module of claim 12 wherein, as hot water is caused to flow through said diverter housing, said first arm of said bi-radial cantilever spring decreases in radius of curvature to close said input gate closure against an input gate stop on an inside surface of said diverter housing, and said second arm of said bi-radial cantilever spring decreases in radius of curvature to close said output gate closure against an output gate stop on an inside surface of said diverter housing.

15. The diverter module of claim 12 wherein said diverter housing comprises at least one of a metal, copper, a copper alloy, a plastic, or a composite material.

* * * * *